(12) United States Patent
Leterrier

(10) Patent No.: US 10,377,429 B2
(45) Date of Patent: Aug. 13, 2019

(54) TWO-PART MOTOR VEHICLE SPOILER

(71) Applicant: Compagnie Plastic Omnium, Lyons (FR)

(72) Inventor: Franck Leterrier, Saint-Priest (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 15/500,129

(22) PCT Filed: Jul. 29, 2015

(86) PCT No.: PCT/FR2015/052100
§ 371 (c)(1),
(2) Date: Jan. 30, 2017

(87) PCT Pub. No.: WO2016/016578
PCT Pub. Date: Feb. 4, 2016

(65) Prior Publication Data
US 2017/0282981 A1  Oct. 5, 2017

(30) Foreign Application Priority Data
Aug. 1, 2014  (FR) ...................................... 14 57520

(51) Int. Cl.
*B62D 35/00* (2006.01)
*B62D 27/06* (2006.01)
(Continued)

(52) U.S. Cl.
CPC ............ *B62D 35/007* (2013.01); *B60J 1/004* (2013.01); *B60J 1/18* (2013.01); *B60J 5/107* (2013.01);
(Continued)

(58) Field of Classification Search
CPC ......... B62D 35/007; B62D 27/065; B60J 1/18
(Continued)

(56) References Cited

U.S. PATENT DOCUMENTS 6,945,593 B2 *  9/2005  Andre .................. B62D 25/105
                                                              293/117
7,878,577 B2 *  2/2011  Thomas ............... B62D 35/007
                                                              296/180.1
(Continued)

FOREIGN PATENT DOCUMENTS

CN          1891556 A       1/2007
CN       101045469 A      10/2007
(Continued)

OTHER PUBLICATIONS

International Search Report PCT/ISA/210 for International Application No. PCT/FR2015/052100 dated Oct. 9, 2015.
(Continued)

*Primary Examiner* — Pinel E Romain
(74) *Attorney, Agent, or Firm* — Harness, Dickey & Pierce, P.L.C.

(57) ABSTRACT

A rear spoiler of a motor vehicle. The spoiler includes a first part intended for being attached to the rear of the vehicle in an attachment position by a first attachment means, and a second part which is intended for being removably attached to the first part in an attachment position by a second attachment means, the second part leaving a portion of the upper surface of the first part visible in this attachment position.

12 Claims, 3 Drawing Sheets

Figure 1:
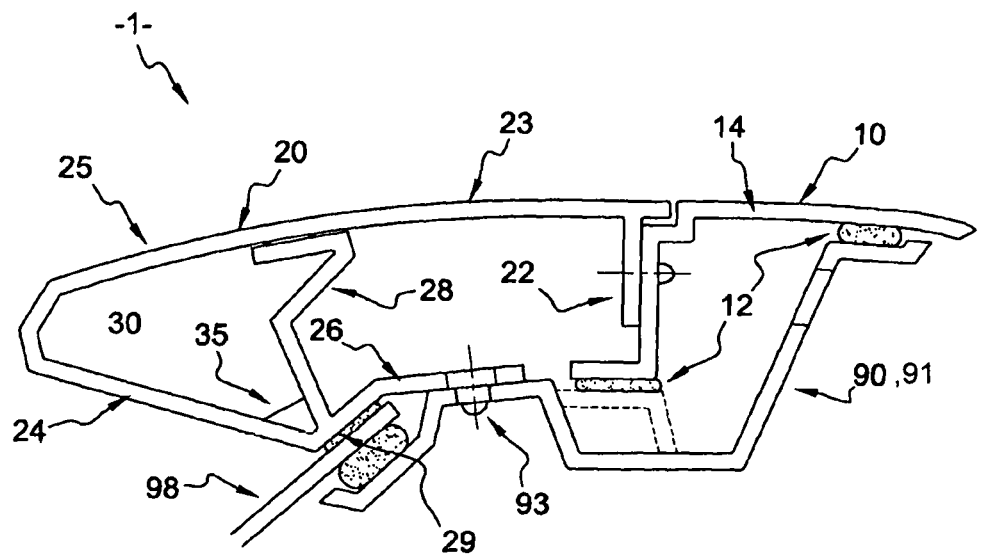

(51) Int. Cl.
*B60J 1/00* (2006.01)
*B60J 1/18* (2006.01)
*B60J 5/10* (2006.01)

(52) U.S. Cl.
CPC ............ *B62D 27/06* (2013.01); *B62D 27/065* (2013.01); *B60Y 2304/07* (2013.01); *Y02T 10/82* (2013.01)

(58) Field of Classification Search
USPC .......................................... 296/180.1, 180.2
See application file for complete search history.

(56) References Cited

U.S. PATENT DOCUMENTS

| | | |
|---|---|---|
| 2007/0001482 A1 | 1/2007 | Larson |
| 2007/0236046 A1* | 10/2007 | Froeschle et al. |
| 2008/0150321 A1* | 6/2008 | Neale .................... B62D 35/00 296/180.1 |
| 2009/0286461 A1 | 11/2009 | Molnar et al. |
| 2013/0221701 A1 | 8/2013 | De Luca |
| 2016/0251041 A1* | 9/2016 | Wolf ....................... F03D 9/32 296/180.1 |
| 2018/0037277 A1* | 2/2018 | Khayat ................ B62D 35/007 |

FOREIGN PATENT DOCUMENTS

| | | |
|---|---|---|
| CN | 101585379 A | 11/2009 |
| EP | 2631160 A1 | 8/2013 |
| GB | 2459980 A | 11/2009 |
| JP | H0195488 U | 6/1989 |
| JP | 2008298229 A | 11/2006 |
| JP | 2009107410 A | 5/2009 |
| WO | WO-2011018566 A1 * | 2/2011 ........... B60Q 1/2661 |
| WO | WO-2013/178902 A1 | 12/2013 |

OTHER PUBLICATIONS

Written Opinion of the International Searching Authority PCT/ISA/237 for International Application No. PCT/FR2015/052100 dated Oct. 9, 2015.
French Search Report for Fench Application No. FR 1457520 dated Mar. 6, 2015.
European Office Action dated May 22, 2018, for corresponding European Application No. 15756971.6.
Chinese Office Action dated Jul. 4, 2018 for corresponding Chinese Application No. 201580041295.X.
Japanese Office Action for corresponding Application No. 2017-504741 dated Feb. 26, 2019.

* cited by examiner

TWO-PART MOTOR VEHICLE SPOILER

CROSS-REFERENCE TO RELATED APPLICATIONS

This application is the U.S. National Phase application of PCT Application No. PCT/FR2015/052100 filed on Jul. 29, 2015, which claims priority to French Application No. 1457520 filed on Aug. 1, 2014, the contents of each of which are incorporated herein by reference.

This invention relates to the field of motor vehicles. It concerns more particularly a rear spoiler of a motor vehicle.

A spoiler is a bodywork part designed to improve the aerodynamics of the vehicle to which this part is attached. Spoilers are also used for aesthetic aspects of the vehicle. The rear spoiler is attached to the rear of the vehicle. It is therefore a body part located and attached between the roof and the rear window. The spoiler can be attached, for example, on the upper part of the tailgate, at the back of the vehicle just above the upper edge of the rear window.

It is advantageous to have a variety of different spoilers (shape, finish, size, etc.), in order to replace it on a vehicle already equipped (e.g. by a garage), in particular to improve vehicle aerodynamics or change the style (exterior appearance). A spoiler may also have to be replaced if it has been damaged.

The spoilers currently used are attached permanently to the vehicle and therefore difficult to remove. It is therefore difficult and expensive to change a spoiler.

This invention aims to overcome these disadvantages.

The invention aims to provide a spoiler whose geometry and exterior appearance are easy to modify, while improving the manufacturing process of the spoiler.

This object is achieved by the fact that the rear spoiler for a motor vehicle comprises:

A first part intended for being attached to the rear of the vehicle in an attachment position by means of first attachment means, A second part which is intended for being removably attached to the first part in an attachment position by second attachment means, the second part leaving a portion of the upper surface of the first part visible in this attachment position.

Thanks to these features, it is easy to vary the geometry and the appearance of the spoiler, and if necessary replace the damaged second part of a spoiler.

In particular, the upper side of the spoiler may have two areas of different colour or appearance, while facilitating and simplifying the spoiler manufacturing process. Thus there is no need, for example, to obtain these two areas, to use a step of masking during the painting process, which is complex and difficult. It is therefore easier to vary the shape or finish these two areas independently, with minimum impact on the production cost of the spoiler. The choice possibilities are increased and therefore the quality perceived by the users is also improved since the spoiler can be customised.

Advantageously, the at least one of the first part and of the second part is structural.

Thus, due to the rigidity of the first part and/or the second part, the spoiler as a whole deforms less in use.

Advantageously the second part is structural and carries a technical element.

Advantageously, the first part is shaped to allow the assembly and removal of a rear window when the first part is in the attachment position.

Thus, the rear window can be assembled on the tailgate carried out traditionally by bonding on an incident path almost perpendicular to the bonding track, irrespective of the spoiler geometry. After assembling the rear window, a second part, of geometry selected from the various geometries available, can be attached.

Advantageously, the second part covers the upper edge of the rear window when this second part is in the attachment position. Thus, the upper edge of the rear window with the bonding area remains hidden (when viewed from the rear of the vehicle), which improves the quality perceived by a potential user of the vehicle, and also protects this area.

According to an embodiment, the second part may comprise a panel and a reinforcement which extends into the interior of the second part, which reinforces said panel.

This reinforcement may be an arm having one end in close proximity to the upper surface of the panel of the second part.

According to this embodiment, the reinforcement and the panel constitute a single part, the reinforcement being hinged to the panel by a narrowed portion of the panel and being foldable in said inner space in a folded position in which it reinforces said panel. The narrowed portion may be a moulded hinge film.

According to the invention, the second part may be attached to the first part by snap-fastening.

According to the invention, the first part can be attached to the lining of a vehicle tailgate, or on the vehicle roof.

Figure 2:
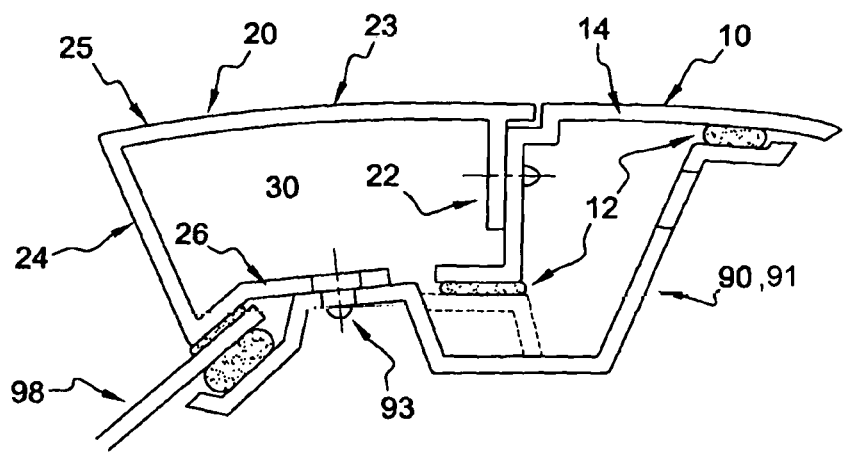
Figure 3:
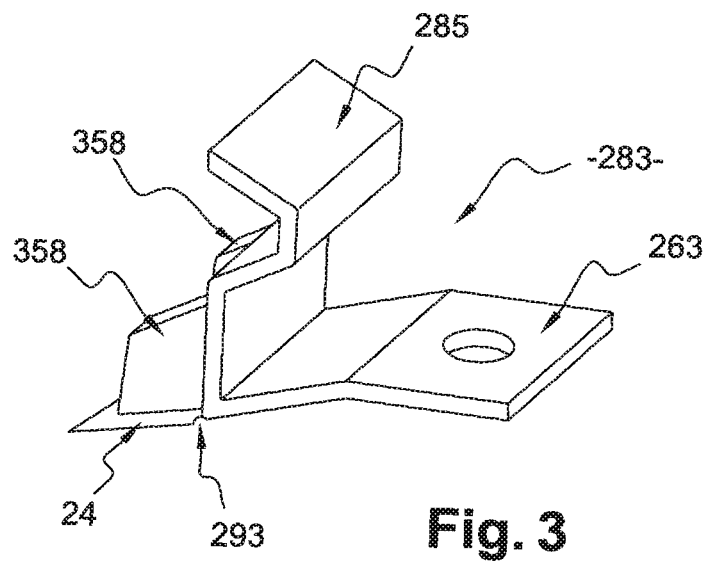
Figure 4:
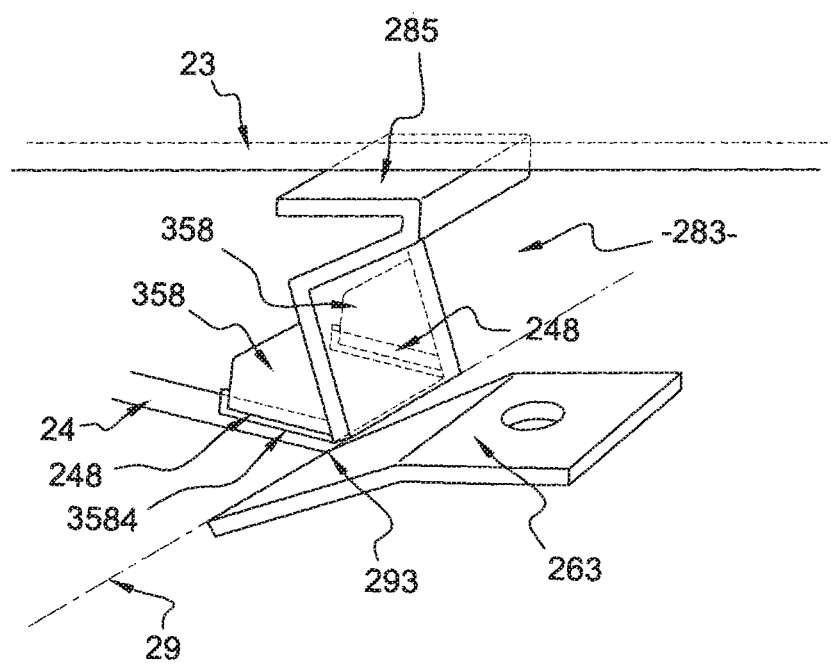
Figure 5:
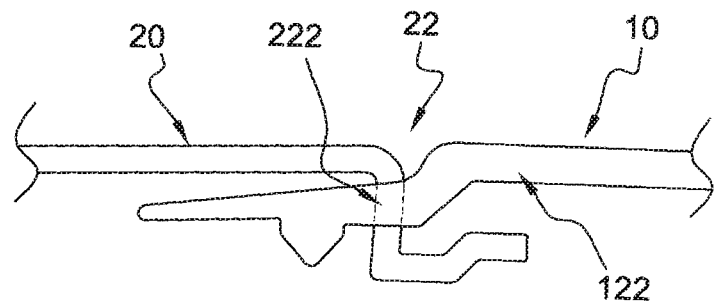
Figure 6:
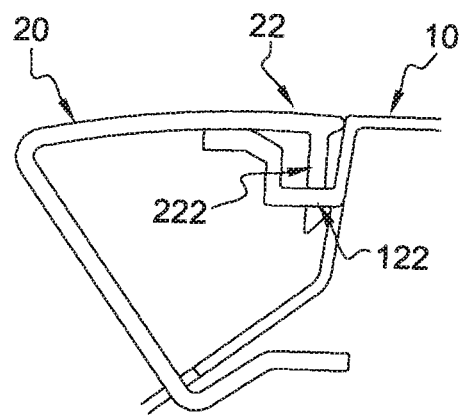

The invention will be clearly understood and its advantages will appear on reading the detailed description below, of an embodiment represented as a non-limiting example. The description refers to the attached drawings, on which:

FIG. 1 is a cross-sectional view of an example of a spoiler according to the invention, FIG. 2 is a cross-sectional view of an example of a variant of a spoiler according to the invention, FIG. 3 is a perspective view of an example of a spoiler according to the invention, illustrating the hinge between the reinforcement and the panel of the second part of the spoiler, FIG. 4 is a perspective view of an example of a spoiler according to the invention, illustrating a variant of the hinge between the reinforcement and the panel of the second part of the spoiler, FIG. 5 is a cross-sectional view of another embodiment of a spoiler according to the invention, illustrating a method of attaching the second part to the first part, FIG. 6 is a cross-sectional view of another embodiment of a spoiler according to the invention, illustrating a method of attaching the second part to the first part.

FIG. 1 illustrates a particular embodiment of a rear spoiler 1 according to the invention.

The spoiler 1 illustrated on FIG. 1 is mounted on a tailgate lining 90 of a motor vehicle. The cross-section of FIG. 1 is in the longitudinal plane of the vehicle (from front to rear), the direction perpendicular to the cross-sectional plane is the left-right direction of the vehicle (transverse direction).

This spoiler 1 comprises a first part 10, which is preferably attached to the tailgate lining 90, in an attachment position using first attachment means 12. These attachment means 12 are for example adhesive, as shown on FIG. 1.

"Attachment position" means the state in which the first part 10 is assembled with the element which carries this first part 10, whether this element is for example the tailgate or the roof. The first part 10 is then assembled with this element.

Alternatively, these first attachment means 12 are permanent mechanical assembly means such as rivets or removable mechanical assembly means, such as nut and bolt assemblies. The first part 10 may also be attached to the tailgate lining 90 at one or more points by one of these means, at one or more other points by another of these means.

The first attachment means 12 may be removable or not. If they are removable, the first part 10 of the spoiler 1 has the advantage of being easy to replace on a given vehicle.

The spoiler 1 illustrated on FIG. 1 also comprises a second part 20 which is removably attached to the first part 10 in an attachment position using second attachment means 22. These attachment means 22 are nut and bolt assemblies distributed in the transverse direction of the vehicle. The second part 20 can also be removably attached by third attachment means 93 to the tailgate lining 90, as shown on FIG. 1. In the case shown on FIG. 1, these third attachment means 93 are nut and bolt assemblies distributed in the transverse direction of the vehicle.

Other types of second removable attachment means 22 are illustrated on FIGS. 5 and 6 and described below.

Once attached to the vehicle, the spoiler 1 thus extends rearwardly from the rear of the vehicle like an aileron, the first part 10 forming the front portion (towards the front of the vehicle) of this aileron, and the second part 20 forming the rear portion (towards the rear of the vehicle) of this aileron. The rear end of this second part 20 forms the trailing edge of the spoiler 1. Thus, on FIG. 1, the front of the vehicle is located to the right and the rear of the vehicle to the left.

According to the invention, in the attachment position of the second part 20 on the first part 10, a portion 14 of the upper face of the first part 10 remains visible.

By saying that a portion 14 of the upper face of the first part 10 remains visible, we mean that this portion is visible at least in plan view of the vehicle. It is preferably also visible for an adult user standing behind the vehicle and close to this vehicle.

Advantageously, the at least one of the first part 10 and the second part 20 is structural.

A structural part of an assembly consisting of several parts means a part whose main function is to contribute to the rigidity of another part of this assembly. Thus, a skin, which designates a part whose rigidity is less than the rigidity of the part (e.g. a support or a longitudinal member, or a tailgate lining or roof of the vehicle) to which it is attached, or a trim, finishing or cosmetic appearance part, is not a structural part.

Advantageously, the spoiler 1 carries a technical element.

When both the first part 10 and the second part 20 are structural, the spoiler 1 is more able to carry a technical element regardless of where this element is located on the spoiler 1.

A technical element means an element providing a functionality to the vehicle other than that of the spoiler. This technical part is for example all or part of a rear signal light, a decorative element (chrome strip, emblem, etc.) or light (backlit strip, etc.), an antenna, a windscreen washer (element composed of the nozzle and the pipe), a wiper, a camera, a sensor, a radar. Where appropriate, this technical element is connected to a power or water supply of the vehicle.

The technical element may be positioned on the first part 10 (unless it is a signalling light) or on the second part 20 of the spoiler 1.

Advantageously, the technical element is positioned on the second part 20.

The technical feature is more visible from another vehicle following the vehicle, which is especially advantageous if it is a signalling light or decorative/light element.

As shown on FIG. 1, which illustrates an advantageous embodiment of the invention, the first part 10 is shaped to allow the assembly and removal of a rear window 98 on the tailgate lining 90 when the first part 10 is in attachment position.

Thus, the first part 10, which is in the attachment position on the vehicle, does not obstruct the attachment of the rear window 98 on the tailgate lining 90. Once the rear window 98 is attached, the second part 20 can be attached on the first part 10. Since the second part 20 is removable, the rear window 98 can still be removed after removing the second part 20 and replaced by another rear window if necessary, without the need to touch the first part 10, which is not necessarily removable. After replacing the rear window 98, the second part 20 is simply attached again to the first part 10.

Advantageously, the second part 20 covers the upper edge of the rear window 98 when this second part 20 is in attachment position.

The lower part of the second part 20 is called the lower surface 24. It hides the upper glued area of the rear window 98.

Thus, the upper edge of the rear window 98 (and in particular the bead of adhesive or seal with the tailgate lining 90) is not visible to a person standing at the rear and outside of the vehicle facing the rear window and the spoiler.

According to an embodiment of the invention, the first part 10 is attached to the tailgate lining 90 of the vehicle as shown on FIG. 1.

In this case, the first part 10 of the spoiler 1 is mounted on the upper part of the tailgate lining 90, i.e. on the top upright of the frame forming the opening for receiving the rear window 98.

The spoiler 1 thus contributes to the structural reinforcement of this rear window 98 frame.

According to an embodiment other than that illustrated on FIG. 1, the first part 10 is attached to the vehicle roof. The roof designates the vehicle roof. This may be the case in particular when the vehicle has no tailgate.

The second part 20 has an interior space 30. This interior space 30 is bounded by the panel 25 of the second part 20. The term "panel" designates the main part of the second part 20 forming a visible wall, giving the exterior general shape (volume, dimensions, etc.) of the second part 20. This panel 25 advantageously has an appearance finish such as paint, a colour obtained by the body-coloured plastic material, chrome plating), a surface condition (smooth, grained). Thus, the upper surface 23 of the panel 25 extends rearward and then curves to form the trailing edge of this second part 20. This trailing edge then extends to form the lower surface 24 of the panel 25. The panel 25 thus forms a box defining the interior space 30. A portion of the first part 10, and optionally a part of the tailgate lining 90 can border the interior space 30.

FIG. 2 represents the case where the second part 20 of the spoiler is in short version, i.e. this second part 20 does not extend, or extends very little, behind the vertical of the rearmost point of contact of this second part 20 with the rear window 98 or with the vehicle.

Advantageously, in long version, the second part 20 comprises a panel 25 and a reinforcement 28 which extends into the interior space 30 of the second part 20, and which reinforces the panel 25.

The embodiment of the invention where the second part comprises a reinforcement 28 is illustrated on FIG. 1, in the case where the second part 20 of the spoiler is in long version, i.e. this second part 20 extends substantially behind the vertical of the rearmost point of contact of this second part 20 with the rear window 98 or with the vehicle. The reinforcement 28 thus constitutes an inner frame which helps to reinforce and stiffen the second part 20 by providing support to its upper surface 23, if the upper surface 23 is indented. In its long version, this upper surface 23 is in fact not rigid enough naturally and could be indented and remain deformed under the effect of external mechanical (for example an impact) or thermal (for example sunshine) stresses which would result in impaired perceived quality or a faulty seal.

For example, the reinforcement 28 is an arm whose free end 285 is in the immediate proximity of the upper surface 23 of the panel 25 of the second part 20.

Immediate proximity means that the distance between the end 285 of the arm 28 and the inner side of the upper surface 23 is less than the maximum distance of elastic deformation of this upper wall 23 at this end 285. In other words, the upper surface 23 will touch the end 285 before deforming irreversibly. Thus, the arms 28 helps to prevent the upper surface 23 from deforming beyond its area of reversible deformations.

Another reason for the presence of the reinforcement 28 in the immediate proximity of the upper surface 23 relates to a subjective notion corresponding, in perceived quality, to the sensation that the part is flexible, in other words that the part moves down when pressed by a finger. This sensation is often perceived as a lack of strength of the part, and is therefore avoided by car manufacturers.

The distance between two objects is defined in the mathematical sense, in other words the minimum length between a point of the first of these objects and a point of the second of these objects.

As illustrated on FIG. 1, the reinforcement 28 extends in a longitudinal plane (cutting plane of FIG. 1) from the lower surface 24 of the panel 25 to the immediate proximity of the upper surface 23. The reinforcement 28 thus extends from the lower surface 24 of the panel 25 to the upper surface 23 without however touching it.

Advantageously, the end 285 does not touch the upper surface 23.

Thus, the arm 28 does not deform the upper surface 23 and therefore does not alter the appearance of the upper surface 23 nor introduce stresses in this upper surface 23 (shrinkage defects visible on the outside).

For example, the distance between the end 285 of the arm 28 and the inner side of the upper surface 23 is non-zero and about 1 mm, preferably less than 0.5 mm.

Advantageously, as shown on FIG. 1, the end 285 of the arm 28 is flat and parallel to the upper surface 23 over a certain distance from the front towards the back of the panel 25. Thus, the support of this upper surface 23, in case of deformation, is improved.

The reinforcement 28 also extends in the transverse direction of the vehicle, between the left end and the right end of the tailgate lining 90 (or equivalently, of the roof 91). The reinforcement 28 forms for example a continuous plate (in this case the arm is a plate extending in the transverse direction).

Advantageously, the reinforcement 28 consists of several elementary reinforcements 283 distributed between the left end and the right end of the tailgate lining 90 (the arm 28 therefore consists of this set of elementary reinforcements 283).

This variant allows or facilitates the demoulding of the reinforcement 28.

Advantageously, as illustrated on FIG. 1, the reinforcement 28 and the panel 25 constitute together a single part made in one piece, the reinforcement 28 being hinged to the panel 25 by a narrowed portion 29 of the panel 25 and being foldable in the inner space 30 in a folded position in which it reinforces the panel 25.

The manufacture of the panel 25 and the reinforcement 28 is thus facilitated. The narrowed portion 29 forms a hinge and allows the reinforcement 28 to pivot between an unfolded position corresponding to its moulding position, and a folded position corresponding to its position assembled in the spoiler where it reinforces the panel 25.

For example, the narrowed portion 29 is a moulded hinge film.

When the reinforcement 28 consists of a plate, the narrowed portion 29 extends substantially over the entire width of the vehicle (in its transverse direction).

When the reinforcement 28 consists of a plurality of elementary reinforcements 283 spaced apart, the narrowed portion 29 consists of a multiplicity of elementary hinges 293, possibly separated, each of these elementary hinges 293 attaching one of these elementary reinforcements 283 to the lower surface 24 of the panel 25.

The narrowed portion 29 is located on an intermediate portion of the lower surface 24 of the panel 25, i.e. between its two ends. Thus, as shown on FIG. 1, this lower surface 24 extends past this narrowed portion 29 by an assembly wall 26. This assembly wall 26 is used to attach itself removably to the tailgate lining 90 at attachment points 93. Alternatively, the assembly wall 26 can be used to attach itself to the first portion 10 of the spoiler 1.

Alternatively, the narrowed portion 29 is located at the rear end of the lower surface 24 of the panel 25, and in this case the reinforcement 28 extends this lower surface 24 only.

Note that in the case of the short version of the second part 20 of the spoiler 1, illustrated in FIG. 2, there is no additional reinforcement 28, since there is no need for one: the upper surface 23 is shorter and therefore less subject to deformation and the wall 24 contributes directly to this role of reinforcement. The assembly wall 26 extends the lower surface 24 only. Optionally, a narrowed portion 20 forming a hinge 29 is located at the interface between the lower surface 24 and the assembly wall 26.

On FIG. 1, the reinforcement 28 is in folded assembly position.

A stop 35 is used to position and attach the reinforcement 28 in folded position.

For example, the stop 35 which blocks and immobilises the reinforcement 28 in folded position is located on the inner side of the upper wall 23.

Advantageously, the stop 35 is located in the immediate proximity of the narrowed portion 29 either on the inner side of the lower wall 24 of the panel 25 or on the reinforcement 28. The stop 35 is shaped to position and attach the reinforcement 28 in its final folded position where it extends between the lower surface 24 and the upper surface 23.

Advantageously the stop 35 is positioned on the reinforcement 28.

This position of the stop 35 allows easier and more reliable manufacturing by injection of the panel 25, reinforcement 28 and stop 35. In addition, shrinkage defects visible on the outer side 25 are avoided by not positioning the stop 35 on the inner side of the upper surface 23.

For example, the stop 35 consists of a plurality of ribs 358 spaced apart from each other, each one extending in a plane perpendicular to the transverse direction of the vehicle. Each plate 358 has an edge 3584 which bears against the inner side of the lower surface 24 of the panel 25 when the reinforcement 28 is in the final folded position.

This situation is shown on FIG. 3, which illustrates in perspective a part of FIG. 1, namely one of the elementary reinforcements 283, plates 358 of the stop 35, an assembly wall 26 and an elementary hinge 293. Each elementary reinforcement 283 carries at least one plate 358 (two in the example of FIG. 3). At each elementary hinge 293, the lower surface 24 extends by an elementary assembly wall 263, the assembly wall 26 consisting of a plurality of these elementary assembly walls 263. Each elementary assembly wall 263 corresponds to an elementary reinforcement 283, attached to the same elementary hinge 293, and together form a rigid elementary assembly.

Advantageously, each plate 358 is housed and wedged in a non-crossing (counterbore) recess 248 formed in a local reduction of the thickness of the lower surface 24 when the elementary reinforcement 283 is in folded position. Wedging is obtained for example using gadroons (beads) located on each internal side face of a slot 248, and which grip by elastic deformation the plate 358 inserted in the recess 248.

Thus, each elementary reinforcement 283 is correctly positioned and held, reversibly, in the folded position.

FIG. 4 illustrates an alternative embodiment of the reinforcement 28. Compared with the situation of FIG. 3, the elementary reinforcements 283 and the elementary assembly walls 263 are located in alternate positions along the hinge 29.

Thus, an elementary hinge 293 carries an elementary reinforcement 283, the adjacent elementary hinge 293 carries an elementary assembly wall 263, the adjacent elementary hinge 293 carries an elementary reinforcement 283, and so on all along the hinge 29.

For example, as shown on FIG. 4, there is substantially no transverse spacing at the hinge 29 between an elementary assembly wall 263, and the elementary reinforcement 283 adjacent to it.

This variant allows easier and more reliable manufacturing by injection of the second part 20. Depending on the shapes of the second part 20, the demoulding stresses may hinder the manufacture of the reinforcement 28 and the assembly wall 26 according to the method of FIG. 3.

FIGS. 5 and 6 illustrate other methods for attaching the second part 20 on the first part 10.

Advantageously, the second part 20 can be attached to the first part 10 by snap-fastening.

According to a first variant, the first part 10 has tabs 122 which snap into holes 222 located on the second part 20. This snap-fastening is performed in a horizontal direction. This variant is shown on FIG. 5.

According to another variant, the first part 10 has holes 122 into which the tabs 222 located on the second part 20 snap. This snap-fastening is performed in a vertical direction. This variant is shown on FIG. 6.

In these two variants, the holes and the tabs, which form the second attachment means 22, are spaced substantially evenly in the transverse direction between the left and the right end 25 of the tailgate 90.

Alternatively, the second attachment means 22 of the second part 20 and first part 10 consist partly of nut and bolt assemblies, partly of snap-fasteners.

The invention claimed is:

1. Rear spoiler of a motor vehicle, said spoiler comprising:
   a first part configured to be attached to a rear of said vehicle in an attachment position by a first attachment means; and
   a second part configured to be removably attachable to said first part in an attachment position by second attachment means, said second part leaving a portion of an upper surface of said first part visible in said attachment position;
   wherein the second part is made in one piece.

2. Rear spoiler according to claim 1, wherein at least one of said first part and of said second part is structural.

3. Rear spoiler according to claim 1, wherein said second part is structural and wherein said second part carries a technical element.

4. Rear spoiler according to claim 1, wherein said first part is shaped to allow assembly and removal of a rear window when said first part is in the attachment position.

5. Rear spoiler according to claim 4, wherein said second part covers an upper edge of said rear window when the second part is in the attachment position.

6. Rear spoiler according to claim 1, wherein said second part comprises a panel and a reinforcement which extends into an interior space of the second part, and which reinforces said panel.

7. Rear spoiler according to claim 6, wherein said reinforcement is an arm which has one end in an immediate proximity of an upper surface of the panel of the second part.

8. Rear spoiler according to claim 6, wherein said reinforcement and said panel constitute together a single part made in one piece, said reinforcement being hinged to said panel by a narrowed portion of said panel and being foldable in said interior space in a folded position in which it reinforces said panel.

9. Rear spoiler according to claim 8, wherein said narrowed portion is a molded hinge film.

10. Rear spoiler according to claim 1, wherein said second part is attached to said first part by snap-fastening.

11. Rear spoiler according to claim 1, wherein said first part is attached to a lining of a tailgate of said vehicle.

12. Rear spoiler according to claim 1, wherein said first part is attached to a roof of said vehicle.

* * * * *

UNITED STATES PATENT AND TRADEMARK OFFICE
CERTIFICATE OF CORRECTION

Page 1 of 1

PATENT NO. : 10,377,429 B2
APPLICATION NO. : 15/500129
DATED : August 13, 2019
INVENTOR(S) : Franck Leterrier It is certified that error appears in the above-identified patent and that said Letters Patent is hereby corrected as shown below:

On the Title Page

(71) Applicant should read: Compagnie Plastic Omnium, Lyon (FR)

(73) Assignee should read: Compagnie Plastic Omnium, Lyon (FR)

Signed and Sealed this
Third Day of November, 2020

Andrei Iancu
*Director of the United States Patent and Trademark Office*